(12) United States Patent
Olson

(10) Patent No.: US 9,752,621 B2
(45) Date of Patent: Sep. 5, 2017

(54) HANGER BEARING ASSEMBLY

(71) Applicant: SUKUP MANUFACTURING CO., Sheffield, IA (US)

(72) Inventor: Ryan Thomas Olson, Dows, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 15 days.

(21) Appl. No.: 14/967,801

(22) Filed: Dec. 14, 2015

(65) Prior Publication Data

US 2017/0167539 A1    Jun. 15, 2017

(51) Int. Cl.
*F16C 35/02* (2006.01)
*F16C 17/02* (2006.01)

(52) U.S. Cl.
CPC .............. *F16C 35/02* (2013.01); *F16C 17/02* (2013.01); *F16C 2360/00* (2013.01)

(58) Field of Classification Search
CPC ................................ B65G 33/32; F16C 35/02
USPC ........................................................ 384/441
See application file for complete search history.

(56) References Cited

U.S. PATENT DOCUMENTS

| | | | |
|---|---|---|---|
| 8,136,654 B2* | 3/2012 | Moreland .............. | B65G 33/00 198/666 |
| 8,157,448 B2* | 4/2012 | Bishop ................... | F16C 17/02 384/154 |
| 8,485,731 B2* | 7/2013 | Beyfuss .................. | F16C 19/54 384/537 |
| 2004/0188226 A1* | 9/2004 | Bass .................. | A22C 21/0053 198/657 |
| 2014/0367226 A1* | 12/2014 | Marchesini ........... | F16C 17/022 198/672 |

OTHER PUBLICATIONS

Brock, "Farm Bin Grain Unloading Systems" Brochure, 8 pages, BR-2123-201204.
Hutchinson "BinUnloading Systems" Brochure, 12 pages, BAC 5322/5/12.
Martin, "Hangers" product list, 2 pages.
NECO "Series "G" Grain U-Trough Augers" Brochure, 4 pages, FM R013000.
NECO "Power Sweep Bin Unloading Systems" Brochure, 4 pages, BAC 04/07/37025.
Norst Industries, "Grain Handling Systems" Brochure, 4 pages, www.norstarindustries.ca.
Springland MFG., "Automated Bin Unloading Systems", Brochure 4 pages, Leach Printing Ltd. 168970.
Sudenga Industries, Inc., "10" U-Trough Power Sweep", Brochure, 2 pages, Jan. 2011.

* cited by examiner

*Primary Examiner* — Thomas R. Hannon
(74) *Attorney, Agent, or Firm* — Zarley Law Firm, P.L.C.

(57) ABSTRACT

A hanger bearing assembly has a bearing enclosed within a plurality of mounting plates. The mounting plates are slidably and removably attached w supports on the interior sidewalls of a trough.

19 Claims, 4 Drawing Sheets

HANGER BEARING ASSEMBLY

BACKGROUND OF THE INVENTION

This invention is directed toward a hanger bearing assembly and more particularly to a self-aligning removable hanger bearing assembly.

Hanger bearing assemblies are well known in the art for use in relation to augers for removal of grain from a bin. Hanger bearing assemblies support the auger to prevent the auger from laying on the bottom of a trough. When used without a hanger bearing assembly operation of the auger is noisy and rough.

To improve upon this some manufacturers use bearing assemblies that are bolted in place and cannot be removed without accessing the trough which is not practical, particularly when the bin is fully loaded. Others use a bearing assembly that rides on and is supported by a rail that extends the entire length of the trough. While helpful, this device requires a specially formed trough. Yet another alternative involves a removable bearing assembly attached to an auger, but the device has no means for preventing the bearing assembly from tipping over as the assembly is slid in and out of the trough. Therefore, a need exists in the art for a hanger bearing assembly that addresses these needs.

An objective of the present invention is to provide a hanger bearing assembly that allows removal of an auger without accessing the bearing assembly.

Another objective of the present invention is to provide a hanger bearing assembly that provides little restriction to flowing grain.

A still further objective of the present invention is to provide a hanger bearing assembly that does not roll over to the side of the auger when slid in and out of a trough.

These and other objectives will be apparent to those having ordinary skill in the art based upon the following written description, drawings, and claims.

SUMMARY OF THE INVENTION

A hanger bearing assembly has a bearing enclosed within a plurality of mounting plates. The mounting plates, which engage one another in side-by-side arrangement, have an elongated support member.

A plurality of trough support members are secured to the inside of the side walls of a trough in spaced parallel relation so as to form a groove. The end of the bearing housing's elongated support member is slidably and removably received within the groove.

DETAILED DESCRIPTION OF THE PREFERRED EMBODIMENT

Figure 1:
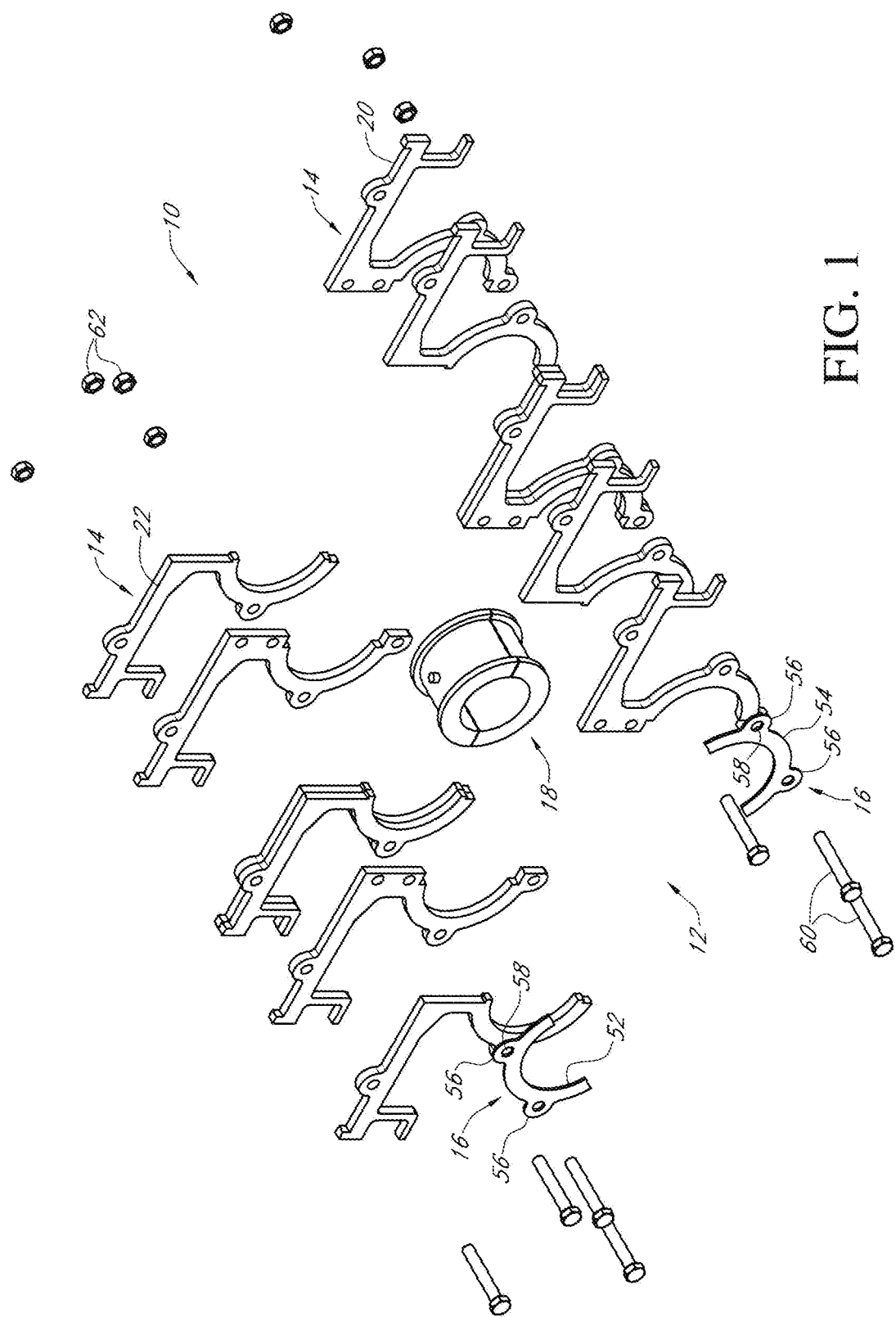
FIG. 1 is an exploded perspective view of a hanger bearing assembly.
Figure 2:
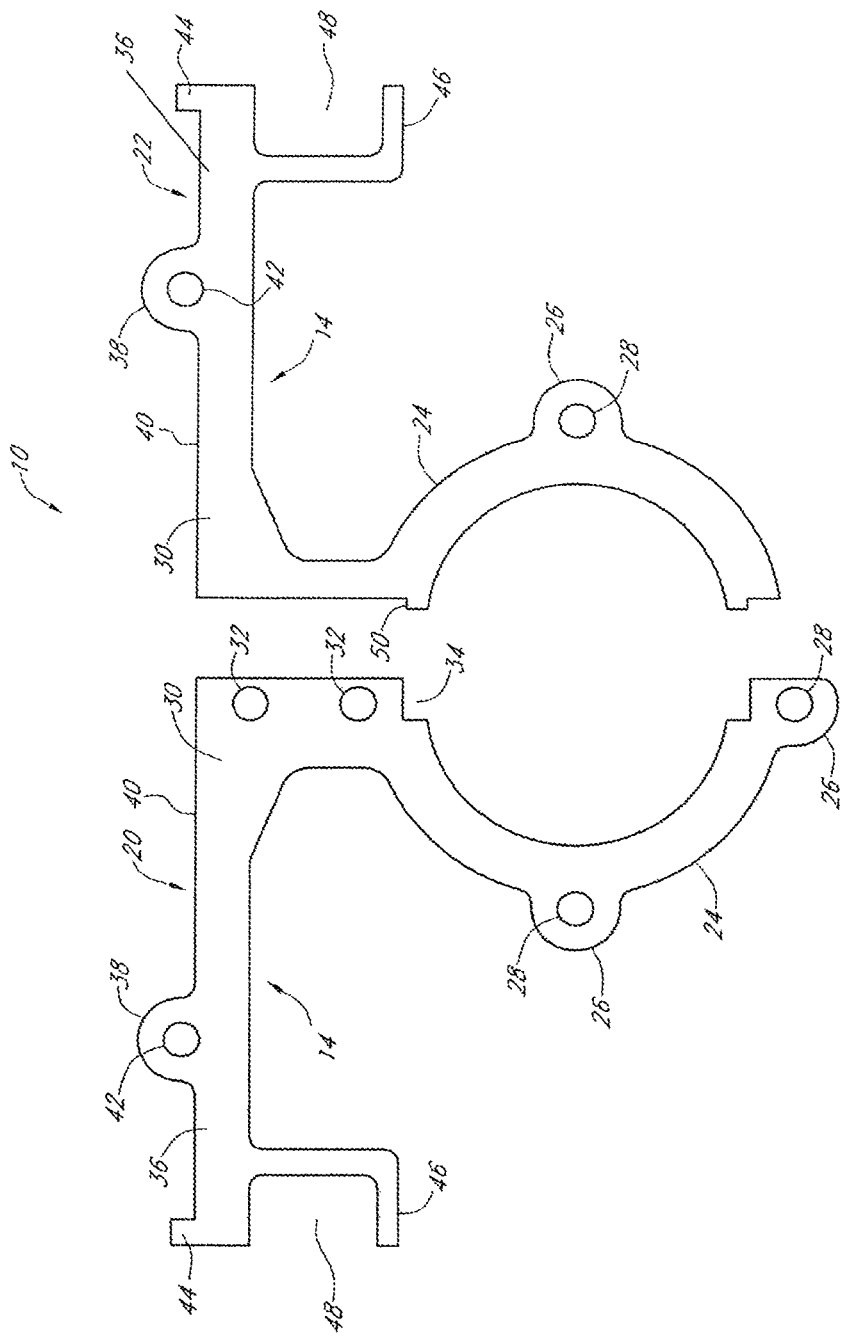
FIG. 2 is an end view of a mounting plate for a hanger bearing assembly.
Figure 3:
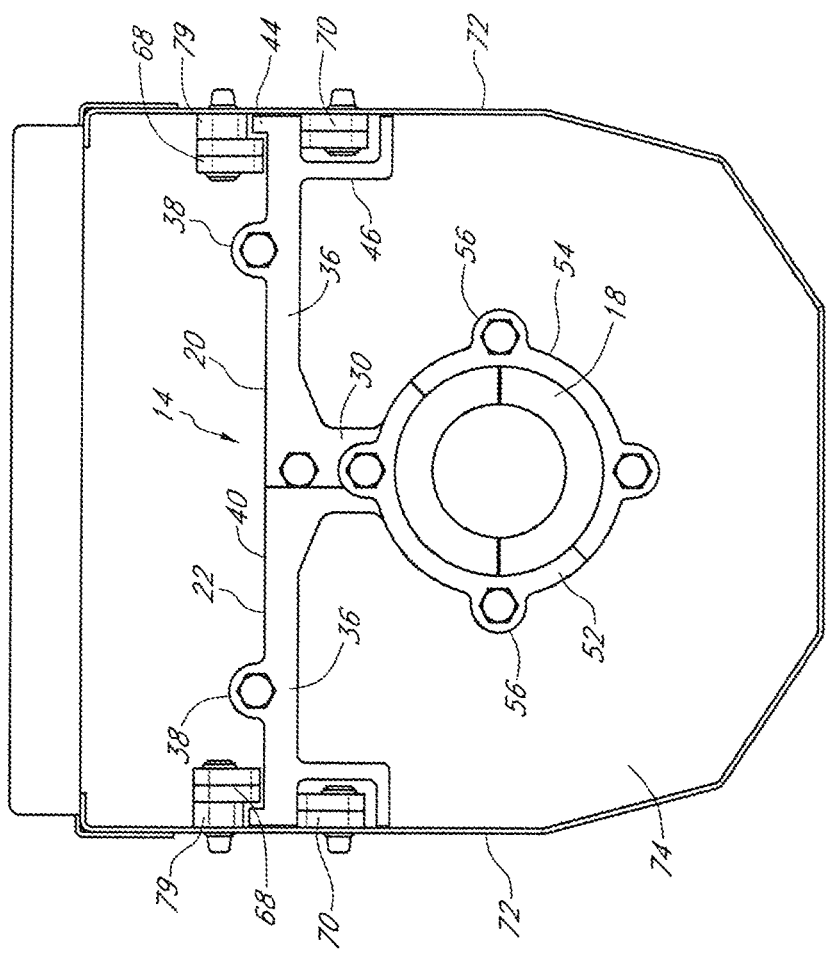
FIG. 3 is an end view of a hanger bearing assembly.
Figure 4:
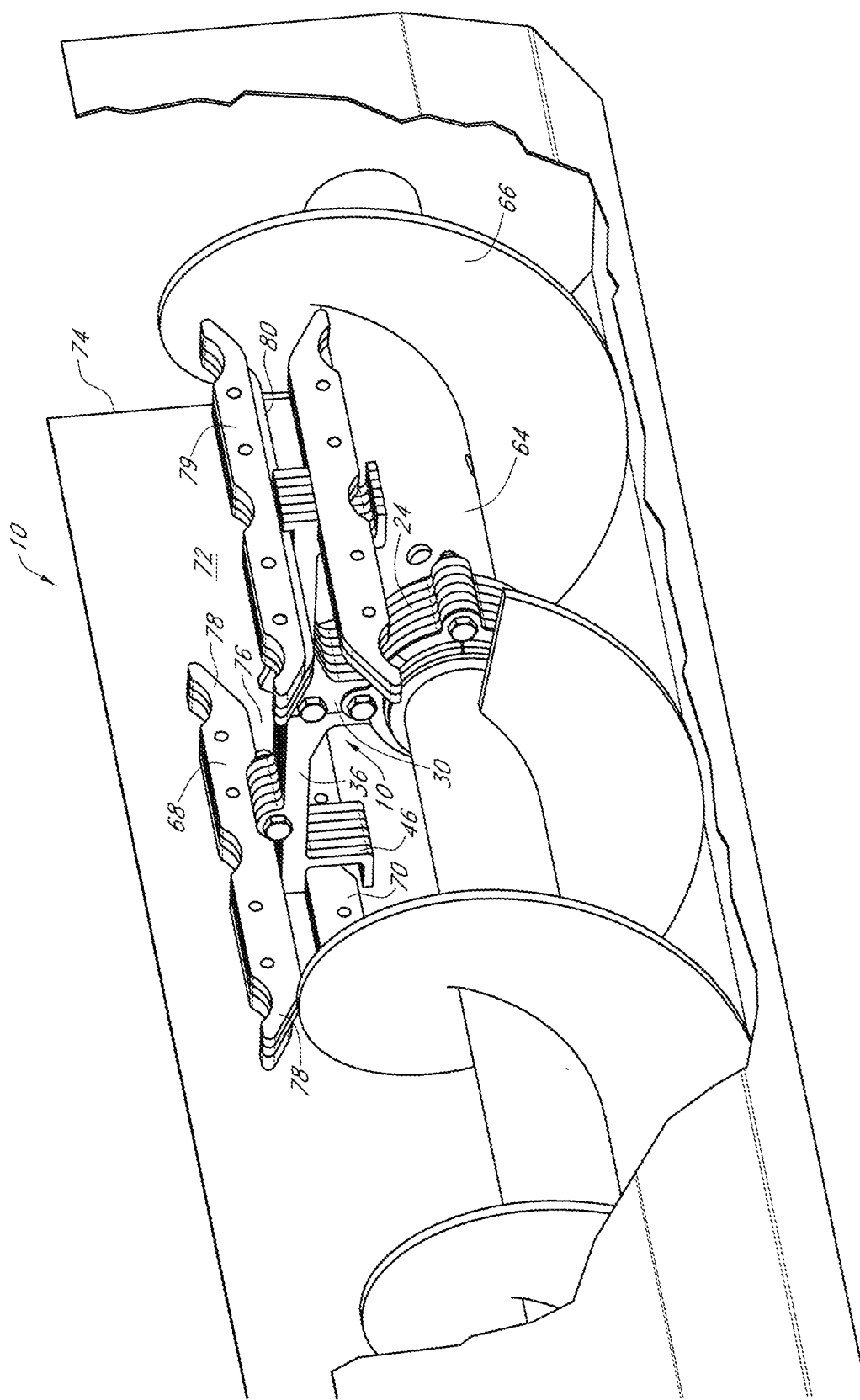
FIG. 4 is a perspective view of a hanger bearing assembly.

Referring to FIG. 1, shown is an exploded perspective view of one example of a hanger bearing assembly 10. The assembly 10 includes a bearing housing 12 formed by a plurality of mounting plates 14, a spacer 16, and a bearing 18. Referring to FIG. 2, each mounting plate 14 has a first 20 and a second 22 side. The first side 20 has a lower arcuate section 24 having a pair of protuberances 26 with each protuberance 26 having an opening or hole 28. The lower arcuate section 24 terminates in a generally vertical connecting section 30 that has a pair holes 32 and a notch 34 on a lower edge. The vertical connecting section 30 terminates in an elongated support member 36 having a protuberance 38 extending upwardly from a top edge 40. The protuberance 38 has a hole 42. The elongated support member 36 terminates in an upwardly extending ear 44 and a downwardly extending L-shaped tab 46. The end of the elongated support member 36 and the L-shaped tab form a C-shaped channel 48.

The second side 22 of the mounting plate 14 is similar to the first side 20, but differs in three ways. First, the lower arcuate section 24 of the second side 22 has a single protuberance 26 having a hole 28. Second, the vertical connecting section 30 does not have holes and also has an outwardly extending prong 50 on a lower edge. The prong 50 is positioned to fit within notch 34 when the connecting sections 30 of the first side 20 and second side 22 are aligned end to end. Third, the elongated support member 36 of the first side 20 is longer than the support member 36 of the second side 22. Also, when the first side 20 and the second side 22 are aligned end to end, the lower arcuate sections 24 form a ring that fits around bearing 18. The bearing 18 is of any type and preferably is made of wood.

To assemble the bearing housing 12 the first 20 and second 22 sides of one mounting plate 14 are aligned end to end around bearing 18 as previously described. The next adjacent mounting plate 14 is reversed and engages the side of the first mounting plate 14 such that holes 28 on the lower arcuate section align as do holes 42 on the elongated support members 36. Because the elongated support member 36 of the first side 20 is longer than the elongated member 36 of the second side 22, when adjacent mounting plates 14 are reversed, holes 32 on the vertical connecting section 30 of each mounting plate 14 align. Additional mounting plates 14 are added, reversing direction each time, so that holes 28, 32, and 42 align. Any number of mounting plates 14 may be used as needed and six are preferred. Preferably, the bearing housing 12 is laminated.

At one end of the bearing housing 12 a spacer 16 engages the side of the mounting plate 14. In one example, the spacer 16 has a first arcuate section 52 and a second arcuate section 54 both having a pair of protuberances 56 with each protuberance 56 having a hole 58. When spacer 16 engages the side of a mounting plate 14, holes 58 align with holes 28 on the lower arcuate section 24 of the mounting plate 14 and with one of the holes 32 on the vertical connecting section 30. To complete the bearing assembly 10 a plurality of screws 60 are inserted through aligned holes 28, 32, 42, and 58 and are secured with locking nuts 62.

The bearing assembly 10 is attached to the shaft 64 of an auger 66 such that the shaft 64 extends through the bearing 18. The bearing assembly 10 is also removably and slidably attached to first or upper supports 68 and second or lower supports 70 that are secured to opposite sidewalk 72 of a trough 74. The first 68 and second 70 supports are secured in spaced parallel relation to form a groove 76 therebetween, are similar in shape, and are inverted in relation to one another. The ends 78 of supports 68 and 70 are tapered away from one another to form ramps. The second support 70 is attached directly to the sidewall 72 of the trough 74, while the first support 68 has a spacer 79 separating the first support 68 from the sidewall 72. The width of the spacer 79 is less than the width of support 68 such that a slot 80 is formed above groove 76.

The bearing assembly 10, with the auger 66 attached, is moved through the trough 74 toward supports 68 and 70. The lower surface of the elongated support member 36 engages a tapered end of the lower support 70. The bearing assembly 10 slides up the ramp or tapered end 78 of the lower support 70 as the ear 44 is received in slot 80 and the end of the elongated support member 36 is received in groove 76. Also, the C-shaped channel 48, partially formed by the L-shaped tab 46 receives the lower support 70. Not only does this raise the auger 66 off the bottom of the trough 74, but the ears 44 within slot 80 keep the bearing assembly 10 locked in place, the upper support 68 keeps the bearing assembly 10 from lifting up, and the L-shaped tab 46 keeps the bearing assembly 10 aligned and prevents the assembly 10 from rolling over. For longer augers 66 requiring multiple bearing assemblies 10 multiple mounts having upper and lower supports 68 and 70 are used.

Thus, a hanger bearing assembly has been disclosed that, at the very least, meets each and every objective.

What is claimed is:

1. A hanger bearing assembly, comprising:
   a bearing housing that receives a bearing connected to a shaft of an auger, wherein the bearing housing includes a plurality of mounting plates in side-by-side engagement;
   a plurality of supports attached to interior sidewalls of a trough in parallel spaced relation to form a groove; and
   wherein the bearing housing is slidably and removably connected to the plurality of supports.

2. The assembly of claim 1 wherein each mounting plate has a lower arcuate section, a generally vertical connecting section, and an elongated support member.

3. The assembly of claim 1 wherein the mounting plates have an ear positioned to be received within a slot formed between an upper support and the sidewall of the trough.

4. The assembly of claim 1 wherein the ends of the plurality of supports are tapered away from the groove.

5. The assembly of claim 1 wherein the mounting plates have a first side and a second side.

6. The assembly of claim 1 further comprising at least one mounting plate having a first side and a second side, with the both the first side and the second side each having a lower arcuate section.

7. The assembly of claim 6 further comprising the lower arcuate section of the first side having a notch on a lower edge that is configured to receive a prong on a lower edge of the lower arcuate section of the second side.

8. The assembly of claim 6 further comprising the first side and the second side each having an elongated support member.

9. The assembly of claim 8 wherein the elongated support member of the second side is longer than the elongated support member of the first side.

10. The assembly of claim 8 further comprising a C-shaped channel at the end of each elongated support member.

11. The assembly of claim 10 wherein a lower portion of at least one support member is received in one of the C-shaped channels.

12. The assembly of claim 6 further comprising the lower arcuate section of the first side having a pair of protuberances, wherein each protuberance is configured to receive a screw.

13. The assembly of claim 6 further comprising the lower arcuate section of the second side having a protuberance, wherein the protuberance is configured to receive a screw.

14. The assembly of claim 1 wherein the bearing housing has six mounting plates.

15. The assembly of claim 1 further comprising a spacer positioned at one end of the bearing housing that engages the side of one mounting plate.

16. The assembly of claim 15 further comprising the spacer having a first arcuate section and a section arcuate section.

17. The assembly of claim 16 further comprising the first arcuate section and the second arcuate second of the spacer each having a pair of protuberances configured to receive a screw.

18. The assembly of claim 1 further comprising the ends of the plurality of supports are tapered away from one another to form ramps.

19. The assembly of claim 1 further comprising at least one support having a spacer positioned between the support and the interior sidewall.

* * * * *